No. 833,016. PATENTED OCT. 9, 1906.
R. ALLEN.
REVOLVING DISK SICKLE FOR CORN HARVESTERS.
APPLICATION FILED DEC. 18, 1905.

Inventor
Robert Allen,

By

Witnesses

UNITED STATES PATENT OFFICE.

ROBERT ALLEN, OF SUVER, OREGON.

REVOLVING DISK SICKLE FOR CORN-HARVESTERS.

No. 833,016.  Specification of Letters Patent.  Patented Oct. 9, 1906.

Application filed December 18, 1905. Serial No. 292,331.

*To all whom it may concern:*

Be it known that I, ROBERT ALLEN, a citizen of the United States, residing at Suver, in the county of Polk and State of Oregon, have invented certain new and useful Improvements in Revolving Disk Sickles for Corn-Harvesters, of which the following is a specification.

The object of my invention is to provide an improved revoluble disk sickle for corn-harvesting machines which will be durable in construction and efficient in operation and avoid all the jerk and wear and tear on a machine of this character which is ordinarily caused by crank-and-pitman actuating mechanism.

With this and other objects in view, as will hereinafter appear as the description proceeds, my invention consists, essentially, of one or more pairs of disks, which are preferably concaved or dish-shaped and are arranged to rotate in a horizontal plane with their cutting devices slightly overlapping, the disks being so arranged that as the corn-harvester travels forwardly the stalks of corn will be drawn inwardly by the rapidly-rotating disks and cut by a shearing motion. By means of the rotating disks I am able to do away with the ordinary crank-and-pitman actuating mechanism that is the essential part of a reciprocating cutter-bar, and thereby avoid wear and tear upon the machine.

The invention also consists in the novel arrangement of the cutting-disks, one of which is provided with a protecting-cover, all as will be hereinafter fully set forth, and specifically pointed out in the appended claims.

For a full description of the invention and the merits thereof and also to acquire a knowledge of the details of construction of the means for effecting the result reference is to be had to the following description and accompanying drawings, in which—

Figure 1 is a plan view of a portion of the corn-harvester embodying the improvements of my invention. Fig. 2 is a detail view illustrating the cutting-disks in side or edge elevation. Fig. 3 is perspective view of one of the disks. Fig. 4 is a longitudinal sectional view on the line 4 4 of Fig. 1, parts being shown in side elevation.

Corresponding and like parts are referred to in the following description and indicated in all the views of the drawings by the same reference characters.

Referring to the drawings, the numeral 1 designates a portion of the frame of the corn-harvester, and 2 designates longitudinally-extending braces which are secured at their rear ends to the rear cross-bar of the framework and extend from thence forwardly in parallel relation a portion of their length. At or near their front ends the braces 2 are curved outwardly or diverge from each other, as indicated at 2ª, and are connected at their front ends to the longitudinal side bars of the framework 1. By this arrangement the braces 2 constitute rearwardly-converging guides designed to receive the corn and drive it to the cutting-disks.

3 designates a transverse brace secured to the side bars of the framework 1 and also to the braces 2 near the rear end of the framework, as shown. Secured to the braces 3 and to the braces 2 and side bars of the frame there are four spider-like bearing-brackets 4, arranged in two pairs, the brackets of one pair being mounted in superposed relation to each other. In each pair of brackets 4 there is journaled a vertical shaft 5, each of which carries a cutter-disk 6. The upper end of each shaft preferably terminates in the same horizontal plane and is provided with a beveled pinion 7, meshing with a similar pinion 8 on a longitudinally-extending shaft 9, mounted in suitable bearings upon the parts 4 and the transverse brace 3. At their rear ends each of the shafts 9 carries a bevel-pinion 10, which meshes with a miter-gear 11 on a transverse shaft 12, and the said shaft carries at one end a sprocket-wheel 13, geared, by means of a chain 14, to a similar wheel 15 on the same shaft with the tractor-wheel 16.

From the above-described gearing it will be evident that as the machine is drawn forwardly the two disks 6 will rotate in the direction of the darts shown in Fig. 1.

One of the main features of my invention resides in the construction and arrangement of the rotating cutter-disks 6. Each of these disks is substantially cup-shaped and is provided with a sharp rim or edge 17, as shown. One of the disks is arranged with its convex surface uppermost, and the other is arranged oppositely—that is, with its hollow side uppermost and with its cutting edge taking under the cutting edge of the first-named disk, so that the two edges will be overlapping, as indicated best in Fig. 2. It will be seen, therefore, that one of these disks is arranged in a lower plane than the other and that the two disks are arranged oppositely to each other with their cutting edges overlapping and substantially in the same horizontal plane. That cutting-disk which is arranged with its hollow side uppermost is provided with a protecting-cover 18, which is mounted on the same shaft therewith and is of substantially cymbal shape, or cup shape inverted. It is of less diameter than the disk on which it is placed, so as to leave the cutting edge of the said disk exposed, and the purpose of the cover 18 is to protect the said disk from the dirt and clips of the cornstalk which would otherwise drop in the hollow of the upturned cutting-disk, and thereby cause rust or unnecessary wear.

In the practical operation of my invention as the machine travels forwardly the stalks of corn will be pulled in by the rotating disks and be cut thereby without causing any stop or jerk to the machine. Hence my invention effects not only important economies in that the parts are not subjected to the strain and excessive wear that crank-and-pitman actuating parts would be subjected to, but also provides means whereby the work may be proceeded with smoothly and be run or operated at an expenditure of much less power.

Having thus described the invention, what is claimed as new is—

1. In a machine of the character described, the combination of cutting-disks each of which is substantially cup-shaped, said disks being arranged with their edges overlapping, one of the disks having its hollow side facing downwardly and the other having the corresponding side facing upwardly, and means for rotating said disks.

2. In a machine of the character described the combination of two substantially cup-shaped cutting-disks arranged with their edges overlapping and facing in opposite directions, and a protecting-cover for one of said disks and means for rotating said disks.

3. In a machine of the character described, the combination of two cutting-disks each of which is substantially cup-shaped one of said disks being arranged with its hollow side downward and the other with its hollow side upward and said disks having their cutting edges overlapping each other, an inverted-cup-shaped protecting-cover secured to the upwardly-facing disk and of a smaller diameter than said disk whereby to expose the cutting edge of the same, and means for rotating said disks.

4. In a machine of the character described, the combination with a framework provided with a converging guideway, of two cutting-disks arranged to project across said guideway each of said disks being substantially cup-shaped and arranged with their hollow portions facing in opposite directions and with their edges overlapping and means for rotating said disks.

5. In a machine of the character described, the combination with a framework having a converging guideway, of cutting-disks mounted in said framework with their cutting edges overlapping and extending into said guideway, all of the said disks being substantially cup-shaped with their hollow sides facing in opposite directions, that is, one downwardly and the other upwardly, a cymbal-shaped cap mounted on the upwardly-facing disk and means for rotating the said disks.

6. A machine of the character described, comprising a framework provided with longitudinal braces converging toward the rear and forming a guideway, two pairs of brackets mounted in said framework at opposite sides of said guideway, cup-shaped disks mounted in said brackets to rotate in horizontal planes, said disks being arranged with their cutting edges overlapping and one of said disks facing upwardly and the other downwardly and the upwardly-facing disk being arranged in a lower plane than the other, a cap or cover mounted on the upwardly-facing disk and of less diameter than the same whereby to leave the cutting edge of said disk exposed, and means for simultaneously and continuously rotating said disks.

In testimony whereof I affix my signature in presence of two witnesses.

ROBERT ALLEN. [L. S.]

Witnesses:
 ETHEL ROSS,
 BENA SUELLING.